J. W. ARNI.
TEST PLUG.
APPLICATION FILED JUNE 15, 1915.
1,181,984.
Patented May 9, 1916.
2 SHEETS—SHEET 2.
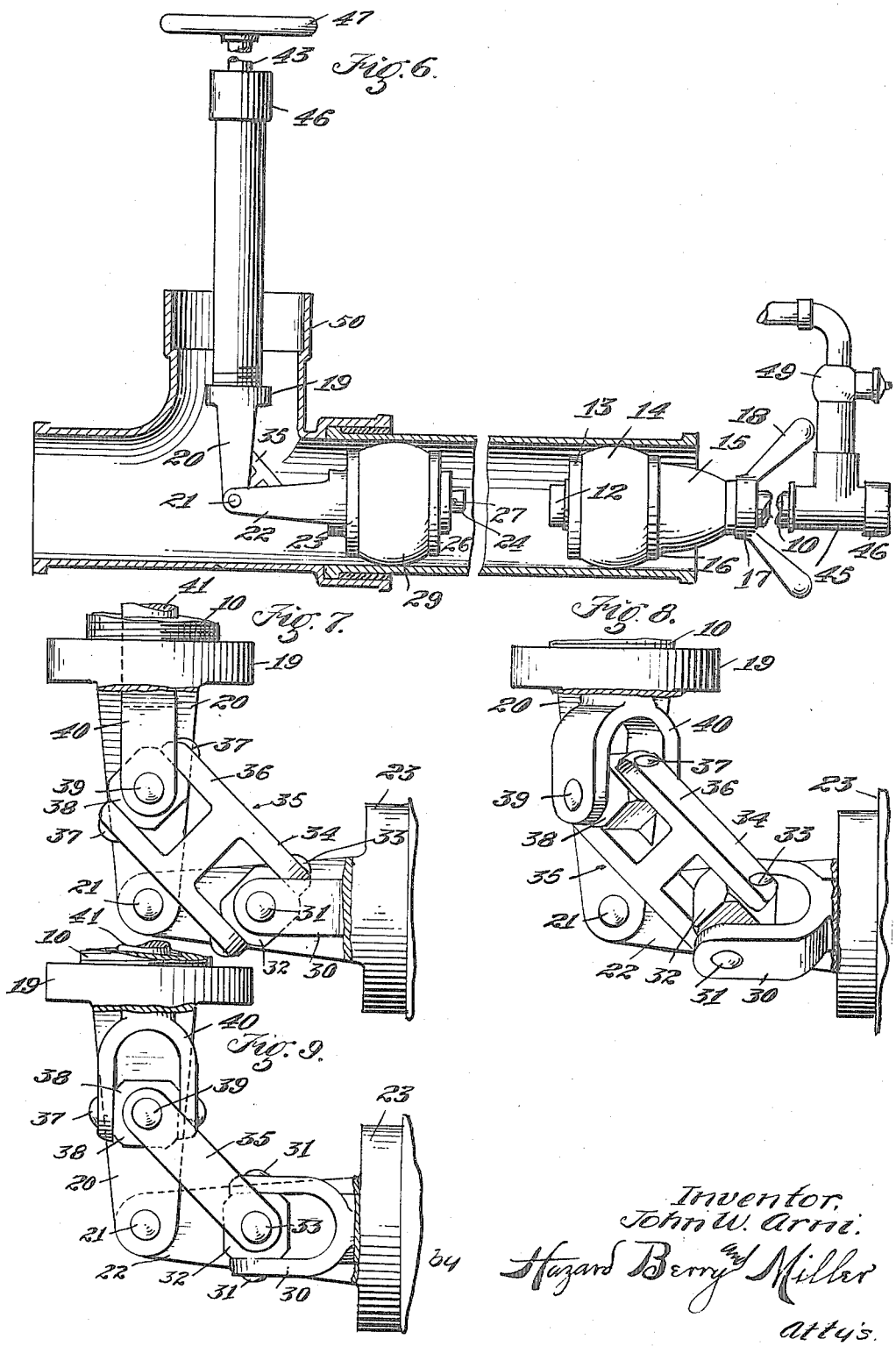
Inventor,
John W. Arni.
by Hazard Berry and Miller
atty's.

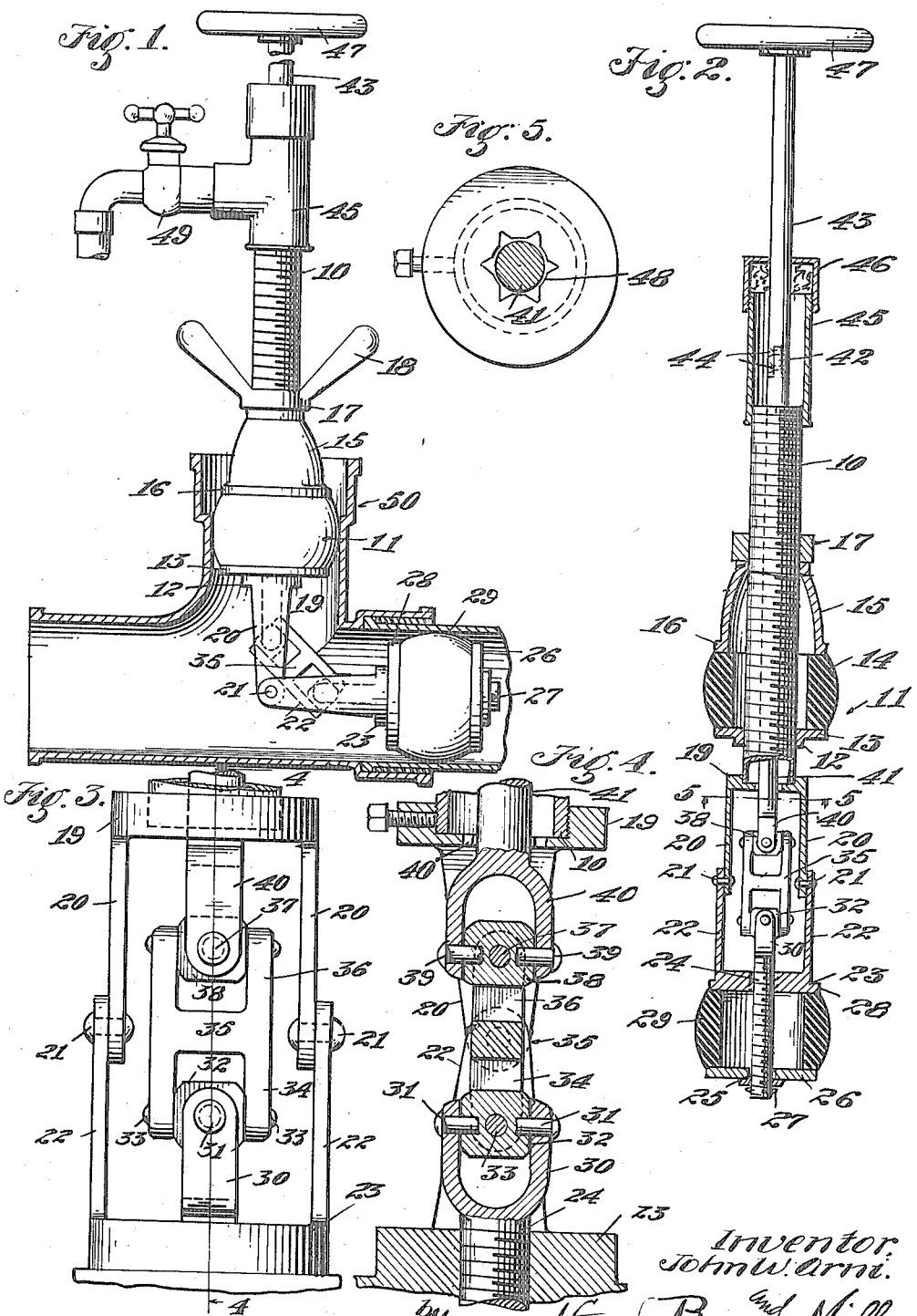

UNITED STATES PATENT OFFICE.

JOHN W. ARNI, OF PASADENA, CALIFORNIA.

TEST-PLUG.

1,181,984.     Specification of Letters Patent.     Patented May 9, 1916.

Application filed June 15, 1915. Serial No. 34,150.

*To all whom it may concern:*

Be it known that I, JOHN W. ARNI, a citizen of the United States, residing at Pasadena, in the county of Los Angeles and State of California, have invented new and useful Improvements in Test-Plugs, of which the following is a specification.

This invention is relative to a test plug and particularly pertains to an adjustable test plug for testing stack or soil pipes, sewer connections, and the like.

It is the object of this invention to provide a test plug of the above character which is adapted to universal application that is, so constructed that it may be employed in either a straight line Y or T fitting, thus obviating the use of separate or of specially constructed test plugs for the various forms of pipe fittings or connections.

The particular object of this invention is to provide an operative pivotal connection between a pair of spaced expansible plug members whereby said plug members may be disposed in a position at right angles to each other and operated independently so that they may be introduced into the stem of a T fitting with one of the plugs positioned within the stem and the other plug disposed in a lateral portion of the fitting and expanded to close the stem and one lateral to the other lateral and the pipe line connected therewith, and which is equally applicable for use in closing the two lateral portions of a T or Y fitting and also in closing the branch and one lateral of a Y fitting.

A further object is to provide means in a test plug of the above type whereby the testing fluid may be readily introduced into the space between the plugs.

Another object is to provide means whereby the spacing of the plugs in relation with each other may be adjusted so that they may be disposed in superposed relation to each other at various distances apart.

Another object is to provide a test plug embodying a pair of plug members which are adapted to be separated and used independent of each other in which one of the plugs may be employed in closing a straight line or end opening of a stack and the other employed in closing a line at its intersection with a T or Y fitting.

The invention is illustrated in the accompanying drawings in which:

Figure 1 is a view of a test plug in side elevation showing it as applied to a T fitting and positioned with the spaced plug members arranged at an angle of 90 degrees in relation to each other. Fig. 2 is a view of a test plug in vertical section showing the plugs in superposed and alined position. Fig. 3 is an enlarged detail in elevation of the universal joint in the operating shaft and showing the pivotal or hinged connection between the plug members; the hinge connection being shown in section. Fig. 4 is a detail section and elevation on the line 4—4 of Fig. 3. Fig. 5 is an enlarged horizontal section on the line 5—5 of Fig. 2 showing the fluid passage between the operating shaft and the tubular stem in which it is mounted. Fig. 6 is a view illustrating the pair of plug members as separated and as employed independently of each other in closing a pipe line between a T fitting and one end of the line. Figs. 7, 8 and 9 are views of the universal joint in side elevation illustrating the operation of same when the plug members are disposed at an angle of 90 degrees in relation to each other.

More specifically, 10 indicates a tubular stem which is externally threaded and forms the main supporting portion of the device and also serves as a mounting for the uppermost plug member 11 which is adjustable thereon. The plug member 11 comprises an internally threaded sleeve 12 on the stem 10 having an outwardly extending flange 13 on which an elastic annulus 14 is supported, and a loose sleeve 15 formed with an outwardly extending flange 16 on its lower edge which seats on the upper edge of the annulus 14 and which sleeve is adapted to be advanced to compress and expand the annulus 14 by means of a sleeve 17 threaded on the stem 10 and fitted with hand-holds 18 by which it may be manually rotated.

Mounted on the lower end of the stem 10 is a collar 19 having downwardly extending spaced limbs 20 forming a yoke, which limbs are hingedly secured by pivot pins 21 to upwardly extending parallel limbs 22 formed on a disk 23. The disk 23 is formed with a threaded bore to receive a screw 24 which extends through an opening 25 formed in a disk 26 which is loosely mounted on the screw 24 and is held in place on the latter by means of a pin 27 which extends transversely through the screw 24 and projects on opposite sides thereof to form a shoulder on which the disk 26 seats. Interposed between the disk 26 and an outwardly extending flange 28 on the disk 23 is a second elastic annulus 29.

The disks 23 and 26 with the annulus 29 constitute the lowermost expansible plug which, by reason of the pivot pins 21, is adapted to be swung into various angular relations to the uppermost plug 11 from an alined position in relation to the latter to a maximum angle of 90 degrees thereto.

The upper end of the screw 24 is formed with a yoke 30 which is connected by pivot pins 31 to a block 32. Connected by a pivot 33 to the block 32 is a yoke 34 which is attached to the block 32 in turnable engagement therewith to move at right angles to the pivot 31 connecting the block 32 to the yoke 30. The yoke 34 is formed on one end of a plate 35 which extends between the limbs 20 and has a yoke 36 on its opposite end which is connected by a pivot pin 37 to a block 38 extending parallel with the block 32. The block 38 is connected by pivot pins 39 to a yoke 40 formed on the lower end of a shaft 41 which extends outwardly within the tubular stem 10 as particularly shown in Fig. 2. The upper end of the shaft 41 is formed with a tongue 42 which extends into a groove formed on an extension shaft 43; the members 41 and 43 being rigidly connected together by screws 44 or other fastenings engaging the member 43 and the tongue 42. The extension shaft 43 projects through a T fitting 45 mounted on the upper end of the stem 10 and passes through a stuffing box or cap 46 carried on the fitting. A hand wheel 47 is mounted on the outer end of the shaft member 43 by which the operating shaft consisting of the members 41 and 43 may be manually rotated to advance and retract the screw 24 in relation to the disk 23 and thereby expand or permit the contraction of the annulus 29.

The operating shaft is of a diameter less than the interior diameter of the stem 10 to form a passage 48 through which fluid may be introduced to the space between the plug members from a point above the uppermost plug member 11. Connecting with the T 45 is a valve 49 which connects with a conduit adapted to be attached to any suitable source of fluid supply such as a water hydrant or hose.

The important feature of the present invention resides in the provision of a pair of yokes and blocks connecting the operating shaft to the screw by a quadruple pivotal connection arranged with each pair of pivotal connections disposed substantially equi-distant on the opposite sides of the hinged connection formed by the pivots 21; this arrangement permitting the screw 24 being rotated by revolving the operating shaft 43 when the lowermost plug is disposed anywhere from an alined position to an angle of 90 degrees in relation to the uppermost plug member 11.

Heretofore, it has been common practice to employ test plugs for individual uses, that is to provide one form of plug for a T fitting, another for a Y fitting, and a third for straight line work, though plugs have been devised which could be applied to either a Y fitting or a straight line connection but which were inapplicable for use on a T fitting in which the plugs must necessarily be disposed at right angles in relation to each other. By the present construction a single test plug serves to answer all purposes, thus obviating the inconvenience and expense incident to the use of special plugs for different occasions, and furthermore is advantageous over the ordinary angularly adjustable plugs in that it admits of use where the plugs are to be disposed at right angles to each other.

In the application and operation of the invention the plug 11 is adjusted on the stem 10 in suitable spaced relation to the lowermost plug which adjustment is effected by raising or lowering the sleeves 12 and 17 by rotating them on their threaded mounting; the sleeve 17 being maintained in such spaced relation to the sleeve 12 as to permit the annulus 14 to assume its normal contracted position. The annulus 29 is disposed in its normal contracted position by rotating the operating shafts so as to retract the flanges 23 and 26 in relation to each other. The lower plug is then introduced through the stem 50 of the T fitting and turned into the lateral portion thereof, as illustrated in Fig. 1; the uppermost plug 11 then being positioned in the stem 50 at right angles to the other plug. In inserting the lower plug into the T it is caused to swing into its angular position which is permitted by the pivotal connection between the limbs 20 and 22, and the universal joint connecting the operating shaft to the screw 24. The uppermost plug 14 is then expanded so as to tightly engage the stem 50 of the T fitting which is effected by rotating the sleeve 17 and advancing it downwardly so as to press the annulus 14 against the flange 13 and force it outwardly as is common in plugs of this type. The annulus 29 is then extended by rotating the operating shaft which operates through the universal joint to retract the screw 24 and thereby cause the disk 26 to advance toward the disk 23 and thereby compress the annulus 29 and cause it to tightly engage the inner wall of the lateral portion of the T or the wall of the pipe connecting with the T. The pivotal connections between the operating shaft and the screw being spaced substantially equi-distant on the opposite sides of the axes of the pivots 21 permit ready rotation of the screw when the latter is disposed at right angles to the operating shaft. The testing fluid is then introduced into the space between the plugs by connecting the conduit to a fluid supply and opening the valve 49; the fluid passing down passage 48 between the operating shaft and the inner wall of the stem 10 being discharged below the plug 14.

When it is desired to detach the device, the operating shaft is rotated to advance the screw 24 to permit contraction of the annulus 29 and disengage the latter from the pipe or fitting. The plug 11 is then released by retracting the sleeve 17 on the stem 10. The plugs may then be readily withdrawn from the fitting.

In some instances it may be necessary to increase the length of the operating shaft as where the plugs are inserted into a stack at a point remote from its connection with the lateral. When this occasion arises the member 43 is removed and replaced by a corresponding member of the desired length. This, with the angular adjustability of the plugs and the construction whereby testing fluid may be admitted to the space between the plugs, provides a test plug of universal application.

What I claim is:

1. In a test plug, a tubular stem, an expansible plug member adjustable longitudinally thereon, a yoke rigidly mounted on said stem, a second yoke pivoted to the first named yoke, an expansible plug member carried by said second yoke, a shaft extending through said stem, and means operable by said shaft for expanding and contracting the last named plug member irrespective of its angular position in relation to the first named plug member.

2. In a test plug, a tubular stem, an expansible plug member adjustable longitudinally thereon, a yoke rigidly mounted on said stem, a second yoke pivoted to the first named yoke, an expansible plug member carried by said second yoke, a shaft extending through said stem, a yoke on said shaft, a block pivoted to said yoke, a plate pivoted to said block, a second block pivoted to the opposite end of said plate, a yoke pivoted on said block, and a threaded stem connected to said last named yoke for operating the last named plug member.

3. In a test plug, a tubular stem, an expansible plug member adjustable longitudinally thereon, a yoke rigidly mounted on said stem, a second yoke pivoted to the first named yoke, an expansible plug member carried by said second yoke, a shaft extending through said stem, a threaded stem connected to the last named plug member, and a universal joint connecting the shaft to said threaded stem.

4. In a test plug, a tubular stem, an expansible plug member adjustable longitudinally thereon, a yoke rigidly mounted on said stem, a second yoke pivoted to the first named yoke, an expansible plug member carried by said second yoke, a shaft extending through said stem, a threaded stem connected to the last named plug member, and a universal joint connecting the shaft to said threaded stem, said universal joint embodying quadruple pivotal connections.

5. In a test plug, a tubular stem, an expansible plug member adjustable longitudinally thereon, a yoke rigidly mounted on said stem, a second yoke pivoted to the first named yoke, an expansible plug member carried by said second yoke, an extendible shaft extending through said stem, means operable by said shaft for expanding and contracting the last named plug member irrespective of its angular position in relation to the first named plug member, and means for introducing fluid to the space between the plug members through said stem.

6. In a test plug, a tubular stem, an expansible plug member adjustable longitudinally thereon, a disk, a yoke connection between said disk and said stem, an expansible plug member adjacent said disk, a stem threaded in said disk adapted to expand and contract the plug member, a drive shaft for rotating said stem, and a universal joint connecting the drive shaft and stem.

7. In a test plug, a tubular stem, a yoke rigidly mounted thereon, a disk pivoted to said yoke having a threaded opening therein, a threaded stem extending through said opening, an expansible plug member adapted to be expanded and contracted by retarding or advancing the threaded stem, an operating shaft extending through the tubular stem, and a universal joint connecting said shaft to the threaded stem.

In testimony whereof I have signed my name to this specification.

JOHN W. ARNI.